United States Patent
Werner et al.

(10) Patent No.: US 8,277,774 B2
(45) Date of Patent: Oct. 2, 2012

(54) METHOD FOR THE PREPARATION OF HIGH PURITY STANNOUS OXIDE

(75) Inventors: Christian Werner, Hannover (DE); Christoph Steinberg, Garbsen (DE); Jessica Maurer, Wunstorf (DE); Harry Zumaque, Cologne (DE)

(73) Assignee: Honeywell International, Morristown, NJ (US)

( * ) Notice: Subject to any disclaimer, the term of this patent is extended or adjusted under 35 U.S.C. 154(b) by 0 days.

(21) Appl. No.: 13/358,561

(22) Filed: Jan. 26, 2012

(65) Prior Publication Data

US 2012/0195822 A1     Aug. 2, 2012

Related U.S. Application Data

(60) Provisional application No. 61/436,695, filed on Jan. 27, 2011, provisional application No. 61/531,447, filed on Sep. 6, 2011.

(51) Int. Cl.
*G01G 19/00* (2006.01)
(52) U.S. Cl. ........................................... 423/618
(58) Field of Classification Search .............. 423/92, 423/618
See application file for complete search history.

(56) References Cited

U.S. PATENT DOCUMENTS

| | | | |
|---|---|---|---|
| 3,546,263 A | 12/1970 | Ruf | |
| 4,495,105 A | 1/1985 | Miller | |
| 5,068,373 A | 11/1991 | Ruf | |
| 5,776,373 A * | 7/1998 | Bergmann et al. | 252/518.1 |
| 6,303,808 B1 | 10/2001 | Knezevic et al. | |
| 2005/0217757 A1 | 10/2005 | Miyano | |
| 2008/0032132 A1* | 2/2008 | Woodfield et al. | 428/402 |
| 2009/0098012 A1 | 4/2009 | Shindo et al. | |
| 2010/0116674 A1 | 5/2010 | Luo et al. | |

FOREIGN PATENT DOCUMENTS

| | | | |
|---|---|---|---|
| CN | 101323463 | * | 12/2008 |
| JP | 60-186416 | * | 9/1985 |
| JP | 03-223112 A | | 10/1991 |

OTHER PUBLICATIONS

M.L. Patterson and M.H. Hahn, "Characterization of Nitrogen-Blanketed Wave Soldering Reactions Using Thermal Analysis," Journal of thermal analysis, vol. 44, No. 6, pp. 1233-1250, Jun. 1995 (US).

Ling C. Zou and C. Hunt, "Electrochemical Behavior of Metal Interconnects in Electronic Assemblies," Journal of Materials Research, vol. 23, No. 10, pp. 2622-2629, Oct. 2008 (GB).

F.I. Pires et al., "Microwave-assisted Hydrothermal Synthesis of Nanocrystalline SnO Powders," Science Direct, vol. 62, pp. 239-242 (2008) US.

* cited by examiner

*Primary Examiner* — Steven Bos
(74) *Attorney, Agent, or Firm* — Erika S. Wilson

(57) ABSTRACT

Provided herein are methods for the preparation of high purity stannous oxide comprising: (a) reacting a Sn salt with a $C_{2-12}$ dicarboxylic acid in the aqueous phase to form a suspension comprising a Sn-dicarboxylate complex; (b) washing the Sn-dicarboxylate complex with water to obtain a wash solution comprising a washed Sn-dicarboxylate complex essentially free of the anion of the Sn salt; and (c) reacting the washed Sn-dicarboxylate complex with a base to form high purity SnO, wherein the high purity SnO has an alpha radiation count of less than about 0.002 $cph/cm^2$.

12 Claims, No Drawings

METHOD FOR THE PREPARATION OF HIGH PURITY STANNOUS OXIDE

CROSS-REFERENCES TO RELATED APPLICATIONS

This application is related to and claims the priority benefit of U.S. Provisional Application No. 61/436,695, filed on Jan. 27, 2011, and U.S. Provisional Application No. 61/531,447, filed on Sep. 6, 2011, both of which are incorporated herein by reference.

FIELD OF THE INVENTION

The present invention relates to high purity tin(II) oxide with low alpha emissions and to methods of preparing the same.

BACKGROUND OF THE INVENTION

For the manufacturing of the next generation of integrated circuit (IC) computer chips, the standard lithographic methods are not adequate. Reducing structure size is not feasible because of quantum effects and interference between the single conducting elements. Thus, the electronic industry has devised so-called 3-D chips, or flip chips. These consist of several IC chips stacked together. The reduced distance between the elements allows for more compact, more complex, and faster processors. Market growth in such chips is expected to be exponential, as more and more consumer electronics require smaller components with higher processing power, e.g. computers, cell phones, and other portable consumer electronic devices.

These stacked elements have to be soldered together, within very demanding tolerances and in such a way as to not impair the function of the IC element. The soldering is achieved by using tin (Sn) or lead (Pb) compounds as solders. The reduced distance between stacked IC chips, however, pose considerable risk that a soft error may occur due to the influence of alpha rays from materials in the vicinity of the IC chip. Accordingly, the solder material and additional functional layers deposited on the electronic devices before or after soldering must be "low alpha", as it is known in the art, meaning that it does not emit alpha radiation (technically, charged helium nuclei, $He^{2+}$). This means ensuring that, in the case of Sn, very high purity Sn and Sn compounds must be used, with no Pb contamination since Pb has an isotope which decays through Polonium, which is an alpha emitter. Other typical alpha emitting contaminants are uranium and thorium, which also must be reduced to a minimum content.

Stannous oxide (SnO) is a tin compound used, for example, during the fabrication of IC chips. As disclosed in US 2010/0116674 and patents cited within, electronic devices are electroplated with Sn or Sn-based alloys. Acid solutions of tin(II) compounds are used for the electroplating process. The amount of Sn deposited on the component parts needs to be replenished regularly or continuously to allow constant operation without quality variation. US 2010/0116674 teaches why SnO is the best source of Sn(II) for that application.

One previously reported method of preparing stannous oxide comprises reacting a stannous salt acidic aqueous solution and an alkali hydroxide solution at a pH of 11-12.5. An alkali carbonate is then added to the mixture to yield stannous oxide. See JP 3223112 A. However, carrying out the reaction of the alkali hydroxide with the stannous salt acidic in the aqueous results in impurities, such as the anions of the stannous salt, residing within the final product. In addition, the high pH levels produce low purity stannous oxide, as does the addition of the alkali carbonate, which introduces contamination by foreign cations.

Accordingly, for certain applications such as in electroplating stacked IC chips, the SnO must be highly pure, which includes being essentially free of corrosive anions, such as halide, essentially free of trace metal impurities, and essentially free of alpha-radiation emitters, as discussed above. Further, it is essential to have a low concentration of stannic oxide ($SnO_2$), since $SnO_2$ does not dissolve in most of the acids used in the electroplating baths. Instead, any stannic oxide present forms sludge in the bath, which requires a potentially troublesome mechanical means for removal. The present invention addresses these needs, among others.

SUMMARY OF THE INVENTION

Provided herein is a method for the preparation of high purity stannous oxide comprising: (a) reacting a Sn salt with a $C_{2-12}$ dicarboxylic acid in the aqueous phase to form a suspension comprising a Sn-dicarboxylate complex; (b) washing the Sn-dicarboxylate complex with water to obtain a wash solution comprising a washed Sn-dicarboxylate complex essentially free of the anion of the Sn salt; and (c) reacting the washed Sn-dicarboxylate complex with a base to form high purity SnO, wherein the high purity SnO has an alpha radiation count of less than about 0.002 cph/cm$^2$.

In certain embodiments, the Sn salt is prepared by dissolving high purity tin metal in a high purity non-oxidizing acid. In certain other embodiments, the method further comprises the step of isolating the Sn-dicarboxylate complex by filtration prior to the step of washing the Sn-dicarboxylate complex. In certain embodiments, the method further comprises the step of isolating the high purity SnO by filtration, and optionally drying the high purity SnO under vacuum at a temperature of from about 60° C. to about 120° C.

In certain preferred embodiments, the high purity SnO comprises SnO in an amount of from about 99.85% by weight, excluding $SnO_2$. Preferably, the high purity SnO comprises $SnO_2$ in an amount less than about 1% by weight.

DETAILED DESCRIPTION OF PREFERRED EMBODIMENTS

Applicants have surprisingly discovered a method for the preparation of high purity SnO with low alpha emissions. More particularly, Applicants have discovered a method of preparing high purity SnO without the need for adjusting the reaction solution to a high pH, which negatively affects the quality of the SnO product. While not wishing to be bound by theory, Applicants believe that the formation of a Sn-dicarboxylate complex produces a suspension, which allows for the removal of unwanted impurities found in the starting materials, particularly those which are alpha-emitting, by precipitation or crystallization. Since this step avoids high pH levels, the undesired side reaction to $SnO_2$ is avoided. In addition, this step mostly removes any foreign anions.

As commonly understood in the chemical arts, the term "stannous oxide" refers to tin(II) oxide, SnO; "stannic oxide" refers to tin(IV) oxide, $SnO_2$. For the purpose of the present invention the terms "high purity" and "highly pure" encompass a purity of at least about 99% by weight, preferably at least about 99.5%, more preferably at least about 99.85% by weight, more preferably at least about 99.9% by weight, still more preferably at least 99.99%, and even more preferably at least 99.999% by weight, excluding any $SnO_2$ present. For the purpose of the invention the term "essentially free" means containing less than 1% by weight, preferably less than 0.1%, more preferably less than 0.5%, still more preferably less than 0.01%, and even more preferably less than 0.001% by weight, excluding $SnO_2$. The content of $SnO_2$ is less than 10% by weight, preferably less than 5%, more preferably less than 1%, still more preferably less than 0.1%, and most preferably less than 0.01% by weight. In one preferred embodiment of the invention, the content of $SnO_2$ is less than about 1% by weight. With regard to contamination by alpha-emitters, the high purity stannous oxide of the present invention preferably has a radiation count of less than 0.002 counts per hour per $cm^2$.

Accordingly, provided herein is a method for the preparation of high purity SnO comprising: (a) reacting a Sn salt with a $C_{2-12}$ dicarboxylic acid in the aqueous phase to form a suspension comprising a Sn-dicarboxylate complex; (b) washing the Sn-dicarboxylate complex with water to obtain a wash solution comprising a washed Sn-dicarboxylate complex essentially free of the anion of the Sn salt; and (c) reacting the washed Sn-dicarboxylate complex with a base to form a low alpha emitting high purity SnO. Preferably, the high purity SnO emits alpha radiation in an amount less than about 0.02 $cph/cm^2$, preferably less than about 0.01 $cph/cm^2$, more preferably less than about 0.005, still more preferably less than about 0.002 $cph/cm^2$, and even more preferably less than 0.001 $cph/cm^2$.

The Sn salt is soluble in solution. In certain preferred embodiments, the Sn salt is selected from the group consisting of $SnCl_2$, $Sn(BF_4)_2$, $Sn(CH_3SO_3)_2$, and mixtures thereof. Other examples of suitable Sn salts are readily apparent and known to those skilled in the art.

The dicarboxylic acids of the present invention comprise dicarboxylic acids containing 2 to 12 carbon atoms, and preferably 2 to 5 carbon atoms. In certain preferred embodiments, the dicarboxylic acid may be a hydroxydicarboxylic acid, such as tartaric acid and malic acid. In certain preferred embodiments, the dicarboxylic acids of the present invention are selected from the group consisting oxalic acid, malonic acid, succinic acid, glutaric acid, and mixtures thereof. While not wishing to be bound by theory, Applicants believe that as solubility of the dicarboxylic acid decreases, so does the specific product yield. In turn, it is believed that short chain (i.e., $C_{2-12}$) dicarboxylic acids will be more apt to form a crystalline compound with Sn(II), allowing for a less cumbersome purification of the Sn-dicarboxylic acid complex.

In certain embodiments, the step of reacting the Sn salt with a dicarboxylic acid is carried out at a low pH, preferably at a pH that is less than about 5, more preferably at a pH that is less than about 3, and even more preferably at pH that is less than or to a pH of about 1. The reaction of the Sn salt with a dicarboxylic acid may also be carried out under continuous stirring for about 1 to about 5 hours under heat, at a temperature of from about 20° C. to about 100° C., preferably about 40° C. to about 80° C., and even more preferably at about 60° C.

In certain embodiments, the Sn-dicarboxylate complex is washed and decanted to obtain the washed Sn-dicarboxylate complex. In certain embodiments, the Sn-dicarboxylate complex is isolated prior to the washing step. Preferably, isolation of the Sn-dicarboxylate complex is achieved by filtration or centrifugation. Other methods of isolation are known to those skilled in the art.

In certain preferred embodiments, the washed Sn-dicarboxylate complex is essentially free of the anion of the Sn salt. For purposes of the present invention, "essentially free" means that the washed Sn-dicarboxylate complex contains less than about 1% by weight of the anion. Preferably, the Sn-dicarboxylate complex contains less than about 0.1% by weight, more preferably less than about 0.5% by weight, and even more preferably less than about 0.01% by weight of the anion. In certain embodiments, the step of washing the Sn-dicarboxylate continues until the wash solution has a neutral pH.

In certain embodiments, the base used to react with the washed Sn-dicarboxylate complex is any compound that will increase the mixture comprising the washed Sn-dicarboxylate complex to a pH of at least 5. Preferably, the base is water soluble in the neutral and protonated form, and is of high purity and low toxicity. In certain preferred embodiments, the base is selected from the group consisting of aqueous ammonia, ammonium carbonate, and urea. Other examples of suitable bases will be known to those skilled in the art. Preferably, the base is not an alkali base. While not wishing to be bound by theory, Applicants believe that the use of an alkali base will introduce contamination by foreign cations. In certain embodiments, the step of reacting the washed Sn-dicarboxylate complex with a base is carried out at a pH that is close to neutral, preferably at a pH range of from about 5 to about 8, and more preferably at a pH range of from about 6 to about 7. The step of reacting the washed Sn-dicarboxylate complex with a base may also be carried out under continuous stirring at a temperature of from about 20° C. to about 80° C., preferably of from about 40° C. to about 65° C.

In certain embodiments, the Sn salt is prepared by dissolving high purity tin metal in a high purity non-oxidizing acid. A non-oxidizing acid is any compound or ion that will dissolve tin metal, either under generation of hydrogen or with the aid of an oxidizer, like oxygen. In certain preferred embodiments, suitable acids are Brønsted-Lowry acids strong enough to dissolve tin with the aid of an oxidizer and/or elevated temperature, and will form a soluble tin salt. In certain preferred embodiments, the anion of the non-oxidizing acid is the same as the Sn salt anion. For example, if $SnCl_2$ is the desired starting Sn salt, a suitable non-oxidizing acid may be HCl. Preferably, the non-oxidizing acid is selected from the group consisting of hydrochloric acid, fluoroboric acid, and methanesulfonic acid.

In certain embodiments, the high purity SnO is isolated and dried. Isolation of the high purity SnO can be achieved, for example, by filtration or centrifugation. Other methods of isolation are known to those skilled in the art. Drying of the high purity SnO can be achieved, for example, by heating the high purity SnO to a temperature of from about 60° C. to about 120° C. for about 2 to about 48 hours. Preferably, the drying will be carried out under vacuum or in an inert gas atmosphere.

EXAMPLES

The following examples are provided for the purpose of illustrating the present invention, but without limiting the scope thereof.

Example 1

Production of Tin(II) Oxalate by Reaction of Oxalic Acid and Tin(II) Chloride

In a 600 mL beaker, about 63 g of high purity oxalic acid dihydrate was dissolved in about 150 g of distilled water, with heating to about 60° C., providing a clear colorless solution. About 211.5 g of an aqueous high purity tin(ii) chloride solution (about 44.8% $SnCl_2$; free acid maximum 10%) was added dropwise with stirring at a temperature of about 60° C. over a period of about 1 hour. The resulting solution was highly acidic (pH about 1). The mixture was cooled to room temperature (about 26° C.) for about 60 minutes, and the coarse white crystals of Sn(II) oxalate were removed by filtration. The solid was rinsed with a total of about 500 mL of distilled water in small portions, until essentially free of chloride ion. From the filtrate a further 3.5 g of product was isolated. Total yield, after vacuum drying, was about 77.4 g.

Total Sn Analysis

Total Sn content was measured by complexometric titration. About 0.25 g of the vacuum-dried product was added into a 300 mL Erlenmeyer flask. About 25 mL of IDRANAL III, 0.1 M, was added and the mixture heated to boiling until a clear solution formed. The solution was diluted to 150 mL with water and cooled to room temperature. The pH was adjusted to about 5-6 with hexamethylenetetramine, and the solution was back titrated with standard 0.1 M zinc sulfate solution to a xylenol orange end point. The total Sn content was determined to be about 55.4% by weight.

Sn(II) Analysis

Sn(II) analysis was performed by iodometric titration. About 50 mL of standard iodine solution (about 0.05 M) was added to about 0.25 g of the vacuum-dried product was added into a 300 mL conical flask. About 2 mL of about 25% hydrochloric acid was added and the flask was immediately sealed with a stopper. The mixture was dissolved using ultrasound within 1 minute. The residual iodine was then titrated with standard 0.1 M sodium thiosulfate solution. The Sn(II) content was determined to be about 54.9% by weight.

Example 2

Production of Tin(II) Oxalate by Reaction of Oxalic Acid and Tin(II) Tetrafluoroborate In a 600 mL beaker, about 63 g of high purity oxalic acid dihydrate was dissolved in about 150 g of distilled water, with heating to about 60° C., providing a clear colorless solution. About 329.1 g of an aqueous high purity tin(II) tetrafluoroborate solution (about 44.4% $Sn(BF_4)_2$) was added dropwise with stirring to the solution at a temperature of about 60° C. over a period of about 1 hour. The resulting solution was highly acidic (pH about 1). The mixture was cooled to room temperature and stirred at that temperature for about 60 minutes. The white crystals of Sn(II) oxalate were removed by filtration. The solid was rinsed with a total of about 500 mL of distilled water in small portions, until neutral. Total yield of Sn(II) oxalate, after vacuum drying, was about 108.9 g. The total Sn and Sn(II) contents were determined to be about 52.3% and about 52.0%, respectively. As above, total Sn content was measured by complexometric titration, and tin (II) content was determined by iodometric titration.

Example 3

Production of Tin(II) Oxide by Reaction of Tin Oxalate with Aqueous Ammonia

In a 500 mL beaker, about 95 g of tin(II) oxalate as produced in Example 1 or 2 are mixed with about 300 g distilled water to form a white suspension. About 58.5 g of aqueous ammonia (25% $NH_3$) are added over about 15 minutes. The temperature is raised to about 60° C. over about 20 minutes and held at that temperature for a further 30 minutes. The black precipitate of SnO is allowed to settle, and most of the liquid is decanted off. An additional 150 g of warm distilled water is added to the SnO suspension and decanted off. The SnO is removed by filtration and washed with 500 mL of distilled water. Total yield, after drying, is 55.4 g. The total Sn and Sn(II) contents were determined, as above, to be 88.05% and 86.5%, respectively.

Example 4

Production of Tin(II) Oxalate by Reaction of Ammonium Oxalate and Tin(II) chloride In a 1000 mL beaker, a solution of ammonium oxalate is prepared by adding 63 g oxalic acid and 68 g ammonia solution (25% $NH_3$) to 450 g distilled water at 60° C. To this was added, drop wise with stirring, 225.6 g of an aqueous high purity tin(II) chloride solution (42.1% SnCl2; free acid 8.5%), at about 60° C., over a period of about 45 minutes. The resulting solution was acidic (pH 1-2). The mixture was cooled to room temperature (about 20° C.) for about 60 min, and the coarse white crystals of Sn(II) oxalate were removed by filtration. The solid was rinsed with a total of about 800 mL of distilled water in small portions, until essentially free of chloride ion. Total yield, after vacuum drying, was about 96.9 g. The total Sn and Sn(II) contents were determined to be 54.0% and 53.7%, respectively.

Example 5

Production of Tin(II) Oxide by Reaction of Tin Oxalate with Aqueous Ammonia

A suspension of about 9.31 kg oxalic acid dihydrate in about 66 kg of water (deionized) is mixed with about 10.06 kg of ammonia solution (25%) for about 60 minutes. The temperature rises to about 60° C. About 40.70 kg of tin chloride solution (content of about 34.4%) is gradually added to the solution over 50 minutes with continuous stirring. A white precipitate is visible after a quarter of the tin chloride solution is added. The suspension is stirred for about 30 minutes at 65° C., followed by cooling to about 22° C. within about 14 hours. Tin oxalate is separated from the liquid by vacuum filtration. It is washed with 176 kg of deionized water. About 17 kg of tin oxalate is recovered and suspended in about 47.8 kg of water. About 9.34 kg of ammonia solution (25%) is added over a period of about 15 minutes. The temperature is raised to about 45° C. and the suspension turns black in color. After stirring for about 30 minutes at about 58° C., SnO is separated on a pressure filter. The solid SnO is washed twice with about 33 kg of warm water and once with about 110 kg of cold water. Tin oxide is dried under vacuum at 80° C. Yield is 12.7 kg SnO. Analytics revealed a chemical purity of >99.99% and an α value of <0.002 cts/cm²/h.

Example 6

Production of Tin(II) Oxide by Reaction of Tin Oxalate with Aqueous Ammonia

A suspension of about 390 kg oxalic acid dihydrate in about 1300 kg of water (deionized) is mixed with about 408 kg ammonia solution (25%) for about 60 minutes. The temperature rises to about 65° C. About 1200 kg of tin chloride solution (content 43.9%) is gradually added to the solution over 3 hours with continuous stirring. A white precipitate is visible after a quarter of the solution is added. The suspension is stirred for about 1 hour at about 60° C., followed by cooling to about 25° C. Tin oxalate is purified by decantation 4 times.

The purified tin oxalate suspension is diluted with additional water to about 2000 kg. Within 1.5 hours, about 348 kg of ammonia solution (25%) is added. The temperature rises to about 40° C. The suspension turns to a black suspension. After stirring for about 1.5 hours at 65° C., SnO is allowed to settle. The ammonium oxalate solution is decanted off, and the solid is washed with three times with warm water. The washed tin oxide is separated by centrifugation at 400 rpm and further washed during centrifugation for about 30 minutes. After pre-drying in the centrifuge, tin oxide is dried under vacuum at about 100° C. for 12 hours. About 320 kg of tin oxide is recovered. Analytics revealed a chemical purity of >99.99% and an α value of <0.002 cts/cm$^2$/h.

What is claimed is:

1. A method for the preparation of high purity SnO comprising:
   (a) reacting a Sn salt with a $C_{2-12}$ dicarboxylic acid in the aqueous phase to form a suspension comprising a Sn-dicarboxylate complex;
   (b) washing the Sn-dicarboxylate complex with water to obtain a wash solution comprising a washed Sn-dicarboxylate complex essentially free of the anion of the Sn salt; and
   (c) reacting the washed Sn-dicarboxylate complex with a base to form high purity SnO,
wherein the high purity SnO has an alpha radiation count of less than about 0.002 cph/cm$^2$.

2. The method of claim 1, wherein the Sn salt is selected from the group consisting of $SnCl_2$, $Sn(BF_4)_2$, $Sn(CH_3SO_3)_2$, and mixtures thereof.

3. The method of claim 1, wherein the dicarboxylic acid is selected from the group consisting of oxalic acid, malonic acid, succinic acid, glutaric acid, and mixtures thereof.

4. The method of claim 1, wherein the base is selected from the group consisting of aqueous ammonia, ammonium carbonate, and urea.

5. The method of claim 1, wherein the step of washing the Sn-dicarboxylate continues until the wash solution has a neutral pH.

6. The method of claim 1, wherein the Sn salt is prepared by dissolving high purity Sn metal in a high purity non-oxidizing acid.

7. The method of claim 6, wherein the non-oxidizing acid is selected from the group consisting of hydrochloric acid, methanesulfonic acid, and fluoroboric acid.

8. The method of claim 1, further comprising the step of isolating the Sn-dicarboxylate complex by filtration prior to the step of washing the Sn-dicarboxylate complex.

9. The method of claim 1, further comprising the step of isolating the high purity SnO by filtration.

10. The method of claim 9, further comprising the step of drying the high purity SnO under vacuum at a temperature of from about 60° C. to about 120° C.

11. The method of claim 1, wherein the high purity SnO comprises SnO in an amount of about 99.85% by weight, excluding $SnO_2$, and wherein the high purity SnO comprises $SnO_2$ in an amount less than about 1% by weight.

12. The method of claim 1, wherein the wash solution comprises less than about 1% by weight of the anion of the Sn salt.

* * * * *